US007411916B2

(12) United States Patent
Sakov et al.

(10) Patent No.: US 7,411,916 B2
(45) Date of Patent: Aug. 12, 2008

(54) DATA FORWARDING METHOD AND APPARATUS

(75) Inventors: Joshua Sakov, San Carlos, CA (US); Mohan Dattatreya, Sunnyvale, CA (US); Vasant Sahay, Sunnyvale, CA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 961 days.

(21) Appl. No.: 10/172,283

(22) Filed: Jun. 14, 2002

(65) Prior Publication Data

US 2002/0196802 A1 Dec. 26, 2002

Related U.S. Application Data

(62) Division of application No. 09/261,470, filed on Feb. 25, 1999, now abandoned.

(60) Provisional application No. 60/076,094, filed on Feb. 26, 1998.

(51) Int. Cl.
*H04L 12/26* (2006.01)
*H04L 12/28* (2006.01)
(52) U.S. Cl. .................. 370/252; 370/390; 370/432
(58) Field of Classification Search ............ None
See application file for complete search history.

(56) References Cited

U.S. PATENT DOCUMENTS 5,309,437 A      5/1994 Perlman et al. .......... 370/85.13
5,331,637 A *    7/1994 Francis et al. ............ 370/408
5,517,494 A *    5/1996 Green ..................... 370/408
5,802,285 A      9/1998 Hirviniemi ............. 395/200.8
5,818,838 A *   10/1998 Backes et al. ............ 370/390
5,835,727 A     11/1998 Wong et al. ........... 395/200.69
5,867,660 A      2/1999 Schmidt et al. ........ 395/200.57
5,872,783 A      2/1999 Chin ....................... 370/392
5,898,686 A *    4/1999 Virgile .................... 370/432
5,905,871 A *    5/1999 Buskens et al. .......... 709/245
5,999,530 A *   12/1999 LeMaire et al. .......... 370/390
6,331,983 B1 * 12/2001 Haggerty et al. ......... 370/432
6,370,142 B1 *   4/2002 Pitcher et al. ............ 370/390

FOREIGN PATENT DOCUMENTS

WO      WO 9634474     * 10/1996

OTHER PUBLICATIONS

"Multichannel WAN Aggregation in the Enterprise", Cisco Systems, inc., 1998.
"Scaling the Routed Wan—New Solutions for Enterprise Central Site WAN Connectivity", Cisco Systems, Inc., 1998.

(Continued)

*Primary Examiner*—Steven Nguyen
(74) *Attorney, Agent, or Firm*—Trop, Pruner & Hu, P.C.

(57) ABSTRACT

A method and an apparatus that reduce the burden on routers by removing the aggregation and physical Wide Area Network (WAN) interface functions from the router are provided. The aggregation and physical Wide Area Network interface transparently forwards traffic and routing information to and from the WAN without becoming a router. The disclosed forwarding technique and apparatus is applicable to IP protocol as well as other protocols. As provided, the routing device is connected to a forwarding device via the Local Area Network (LAN) and the IP Multiplexer forwards data packets to one or more physical WAN links.

23 Claims, 12 Drawing Sheets

OTHER PUBLICATIONS

"Requirements for Internet Gateways", R. Braden and J. Postel, RFC Hypertext Archive, Jun. 1987, (available at: http://intranet.www-kr.org/RFC/rfc/rfc1009.html).

"Using ARP to Implement Transparent Subnet Gateways", S. Carl-Mitchell and J.S. Quarterman, RFC Hypertext Archive, Oct. 1987. (available at : http://intranet.www-kr.org/RFCrfc/rfc1027.html).

* cited by examiner

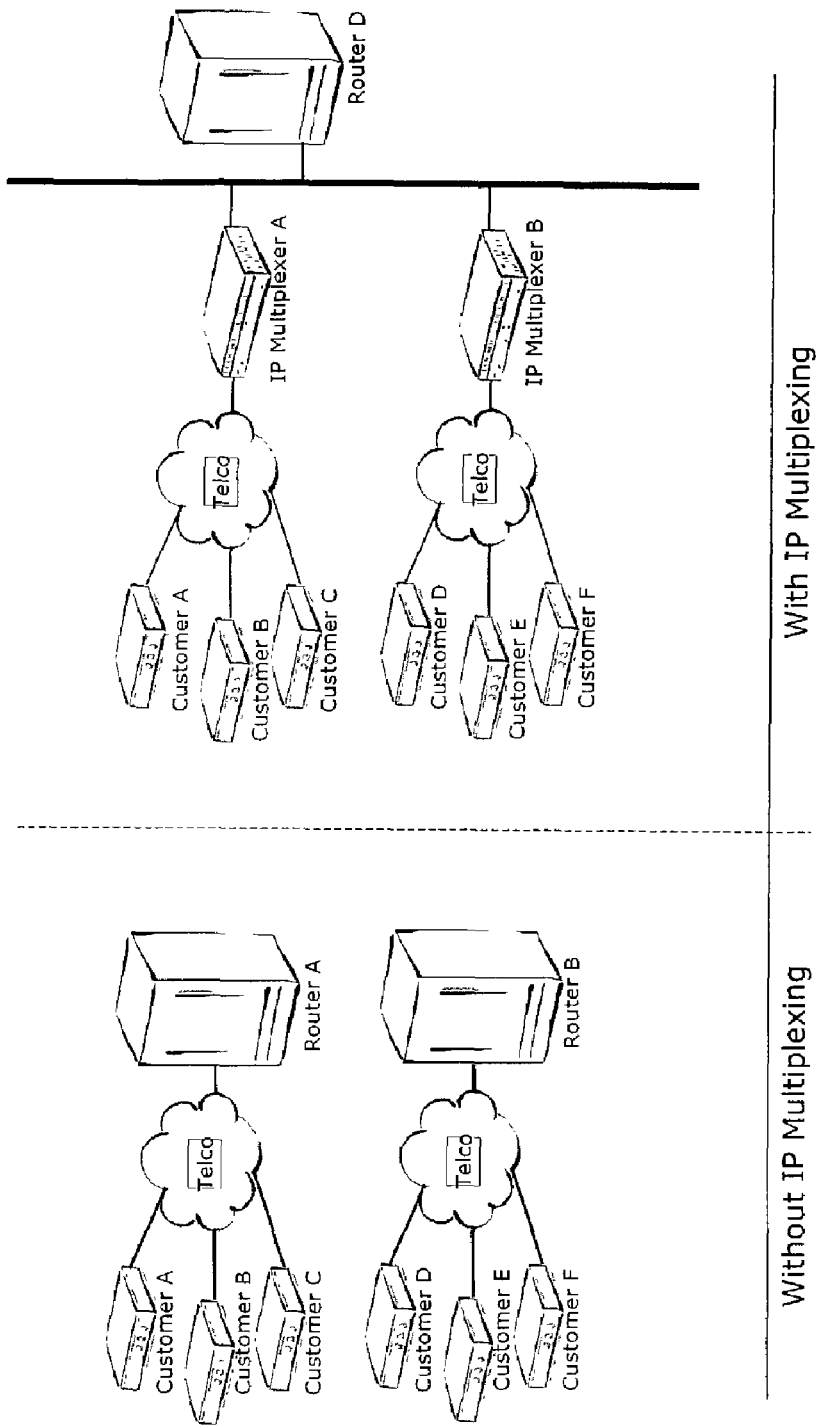

IP Multiplexing Tables

| Destination Prefix | WAN Link |
|---|---|
| 126.2.12.3/32 | WAN 1 |
| 126.2.13.15/32 | WAN 1 |
| 124.2.212.96.80/30 | WAN 1 |
| 115.196.111.99/28 | WAN 2 |
| 124.212.96.66/29 | WAN 3 |
| 126.2.13.157/30 | WAN 4 |
| 115.196.111.90/28 | WAN 5 |

*Entered Manually*

| Link | MAC Address |
|---|---|
| WAN 1 | AEF42248B2 |
| WAN 2 | AEF42248B3 |
| WAN 3 | AEF42248B4 |
| WAN 4 | AEF42248B5 |
| WAN 5 | AEF42248B6 |
| WAN 6 | AEF42248B7 |

*Created Automatically*

Figure 5

| MULTICAST GROUP | GROUP MEMBERS |
|---|---|
| 224.1.1.1 | WAN1, WAN2 |
| 225.1.1.2 | WAN1, WAN 3 |
| 226.0.0.2 | WAN3, WAN4 |
| 227.0.0.3 | WAN5, WAN6 |
| 228.0.0.4 | WAN3, WAN4, WAN5 |

FIG. 12

DATA FORWARDING METHOD AND APPARATUS

CROSS REFERENCE TO RELATED APPLICATIONS

This is a divisional of U.S. Ser. No. 09/261,470, filed Feb. 25, 1999, now abandoned, which claims priority under 35 U.S.C. § 119(e) of U.S. Provisional Application Ser. No. 60/076,094, filed Feb. 26, 1998, and entitled IP Multiplexing Packet Forwarding.

FIELD OF THE INVENTION

The invention relates to forwarding data, such as packets and, in particular, to forwarding data both efficiently, and transparently to routers.

BACKGROUND

The Internet is undergoing explosive growth in order to support a dramatic increase in users, applications and services. This growth is resulting in network congestion as the existing Internet infrastructure struggles to handle the increased load. Internet service providers and their customers are looking for ways to cost effectively upgrade the existing infrastructure to handle this growth and be positioned for continued growth in the future. Faster and more affordable Internet access techniques are required.

Some background of how networks conventionally operate is briefly discussed. Conventionally, separate computing devices are connected to one another through networks that forward information based upon the destination IP address provided in the Internet Protocol. Devices in the same geographical proximity are typically connected by Local Area Networks (LANs) such as Ethernet networks. These computing devices learn the IP address (identity) of other computing devices on the same LAN by broadcasting an address resolution request to all computing devices on the LAN. Computing devices that are not on the same LAN require assistance in locating each other and typically communicate with an intermediary device whose purpose is to determine a path between the two devices and forward information onto this path. These intermediate devices typically use routing protocols to determine this path and are frequently referred to as routers or route switches.

In short, routers are devices that direct traffic between hosts, typically by building routing tables that contain information on the best paths to all destinations that they know how to reach. Routers use a hop-by-hop mechanism to keep track of the next-hop information in order to forward packets to their ultimate destination.

As networks have become more complex, routers have been asked to perform several other functions, besides routing. Some routers can be used to enable computing devices to transfer information to and from other computing devices in different geographical areas. These networks are called Wide Area Networks (WANs), and routers connect computing devices on LANs to one or more WAN links via physical WAN interfaces integrated into the router or provided by an external WAN access device. These routers perform routing, aggregation of WAN links and provide physical connections to the WAN links, as shown in FIG. 1A. Link aggregation is the bonding of multiple channels into a single, higher speed connection.

The increase in transfer of electronic information over the Internet is putting an increased burden on routers. The current Internet infrastructure depends on highly integrated routers or a combination of router and data service units (DSU) products to provide high speed access to the Internet.

It is desired to provide a method and apparatus to forward data (such as IP datagrams) across a network without invoking routing. Existing alternatives for forwarding IP datagrams across a device without forcing that device to become another router on the network are inadequate for this objective. For example, bridging and static forwarding are two standards-compliant vendor interoperable solutions in use today, but both solutions were unable to meet the objectives for forwarding.

One possible alternative is IEEE 802.1d: Transparent bridging (switching), which is widely deployed in interconnecting Ethernet switched Local Area Networks. A transparent bridge operates in promiscuous mode, accepting every frame transmitted on all the LANs to which it is connected. When a bridge is first plugged into the network, its tables are empty. So it uses a flooding algorithm and outputs every frame on the LANs to which the bridge is connected, except for on the LAN the frame came on. The bridge then uses an algorithm called "Backward Learning". Since the bridges operate in promiscuous mode, they look at the source MAC address to determine which machine is accessible on which LAN. They use this information to build their forwarding table. It uses this table information to forward subsequent packets to the host whose address it had learned previously.

Bridging has several severe disadvantages when considered for use between heterogeneous network links. Bridging is not feasible on such links because frames on the WAN links do not have data link layer MAC headers, while frames on the LAN segments do. Therefore, a bridge would be unable to perform the backward learning algorithm on WAN links. If a bridging solution was used, then all LAN traffic would have to be flooded on all the WAN links. This is extremely wasteful of bandwidth and prevents scaling to levels demand by service providers. Further, bridging does not support load balancing and multi-homing. To summarize, bridging makes inefficient use of WAN links; broadcast messages waste expensive bandwidth; and bridging does not support efficient load-balancing in multi-homing applications.

Another potential alternative is static forwarding, which refers to routes being manually entered into the routers. Network reachability is not dependent on the state of the network itself. Whether a destination is up or down, the static routes would remain in the table and traffic would be sent towards the destination. Static forwarding is a less than optimal solution for WAN aggregation and forwarding. Since the ISP community is organized in a tiered manner, most Tier 1 ISPs have smaller ISPs as customers. Therefore, using static addresses, when a customer ISP adds or removes customers, routes must be manually added or removed, as shown in FIG. 3. This can become quite cumbersome and unmanageable. Additionally, without running dynamic routing protocols, intelligent route selection can not be made. Network problems can not be bypassed and service interruptions can occur. To summarize, static forwarding does not scale to higher-tier ISP's; higher-tier ISP's have other ISP's as customers, and static forwarding requires manual updating even when the other ISP's customers change; and static forwarding does not provide for intelligent routing.

SUMMARY

The invention provides a method (IP Multiplexing, in one embodiment) and apparatus (IP Multiplexer, in one embodiment) that reduces the burden on routers by removing the aggregation and physical WAN interface functions from the router. The aggregation and physical WAN interface transparently forward traffic and routing information to and from the WAN, as shown in FIG. 1B, without becoming a router. Although the present disclosure is in terms of IP protocol, the forwarding technique/apparatus of the invention may be equally applicable to other protocols. With the method in accordance with the invention, the routing device is connected to a forwarding device via the LAN and data packets are forwarded to one or more physical WAN links by the IP Multiplexer, as shown in FIG. 2B.

The WAN functions are separated from routing functions. The method and apparatus provide a fast packet forwarding technology to forward traffic and routing information to and from the WAN, while being transparent to the other devices on the network. The wide area network (WAN) aggregation and physical layer functionality are performed, while connecting over a LAN to any device performing routing.

By moving to this new paradigm of Internet access, Internet Service Providers can decrease the cost of their networks by reducing the number of routers required for Internet aggregation, again referring to FIG. 2B. Any router (even less sophisticated—less expensive—routers) can act as an access router. Significantly, the capacity and speed of routers are increased by freeing the routers from performing complex WAN aggregation and forwarding processing functions. With the invention, Service Providers have a scaleable platform and the flexibility to move from routers to high speed switching infrastructures in the future. At the same time, investments in existing access equipment are protected.

There are several basic advantages to separating the WAN interface and link aggregation functions from the router: cost, performance, scalability, and preservation of investment. The cost of the router, required to perform routing in a network, is lower. Performance of the router for routing functions is increased by allowing the router to concentrate on routing. Data throughput of networks can be scaled without installing new routers, and network's investment in existing equipment is preserved.

BRIEF DESCRIPTION OF THE FIGURES

FIG. 2A shows how WAN functions are conventionally handled by a router, and FIG. 2B shows how WAN functions are offloaded from a router by an IP Multiplexer.

FIG. 5 shows tables employed within an IP Multiplexer.

FIG. 12 shows an example table of multicast groups and group numbers.

DETAILED DESCRIPTION

One embodiment in accordance with the invention, IP Multiplexing, is a technique for data forwarding (data packets, in one embodiment) between multiple Local Area Networks and Wide Area Networks links. An IP Multiplexer is a device with both LAN and WAN ports, implementing IP Multiplexing as a forwarding technique between the two.

An IP Multiplexer forwards IP packets without utilizing a routing protocol or maintaining a routing table. Instead, it allows the routers in the network to make all the routing decision and forward packets on the route chosen by them.

How does IP Multiplexing work? In one embodiment, IP Multiplexing uses IEEE MAC addresses as tags to direct traffic unto the appropriate WAN link. IP Multiplexers assign a separate virtual MAC address to each WAN link from a pre-assigned (by IEEE) range of MAC addresses. In addition, the service providers configure IP addresses on each of the WAN links. The tables associated with IP Multiplexing, in one embodiment, are illustrated in FIG. 5. Whenever any router on the Ethernet segment wishes to communicate with another station across the WAN on the far side of the IP Multiplexers, it sends an ARP request to obtain the next hop router's MAC address. ARP request is broadcast when a host A wishes to communicate with a host B and A knows B's logical Internet address but does not know B's physical address. An ARP request is broadcast for the unknown physical address, and the host that has the required Internet address responds with a reply that includes the desired physical address. This is just as the router would do in a conventional routing environment, because the router is not aware of the presence of the IP Multiplexer and believes that the remote router is present on the same LAN.

Figures 1A, 1B:
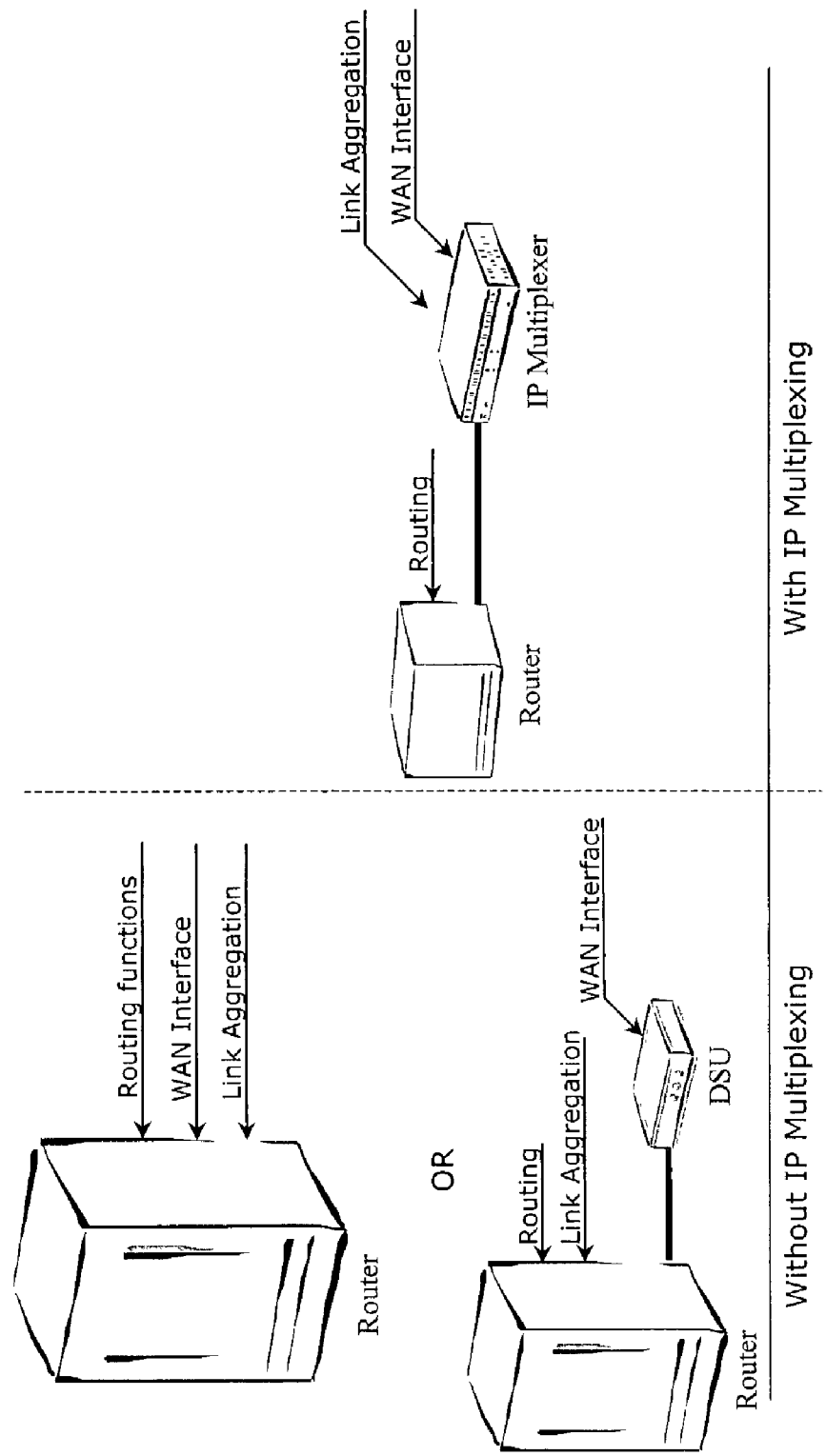
FIG. 1A shows the functions of a conventional router.
FIG. 1B shows a breakdown of functions between a conventional (or other) router and an IP Multiplexer.
Figure 3:
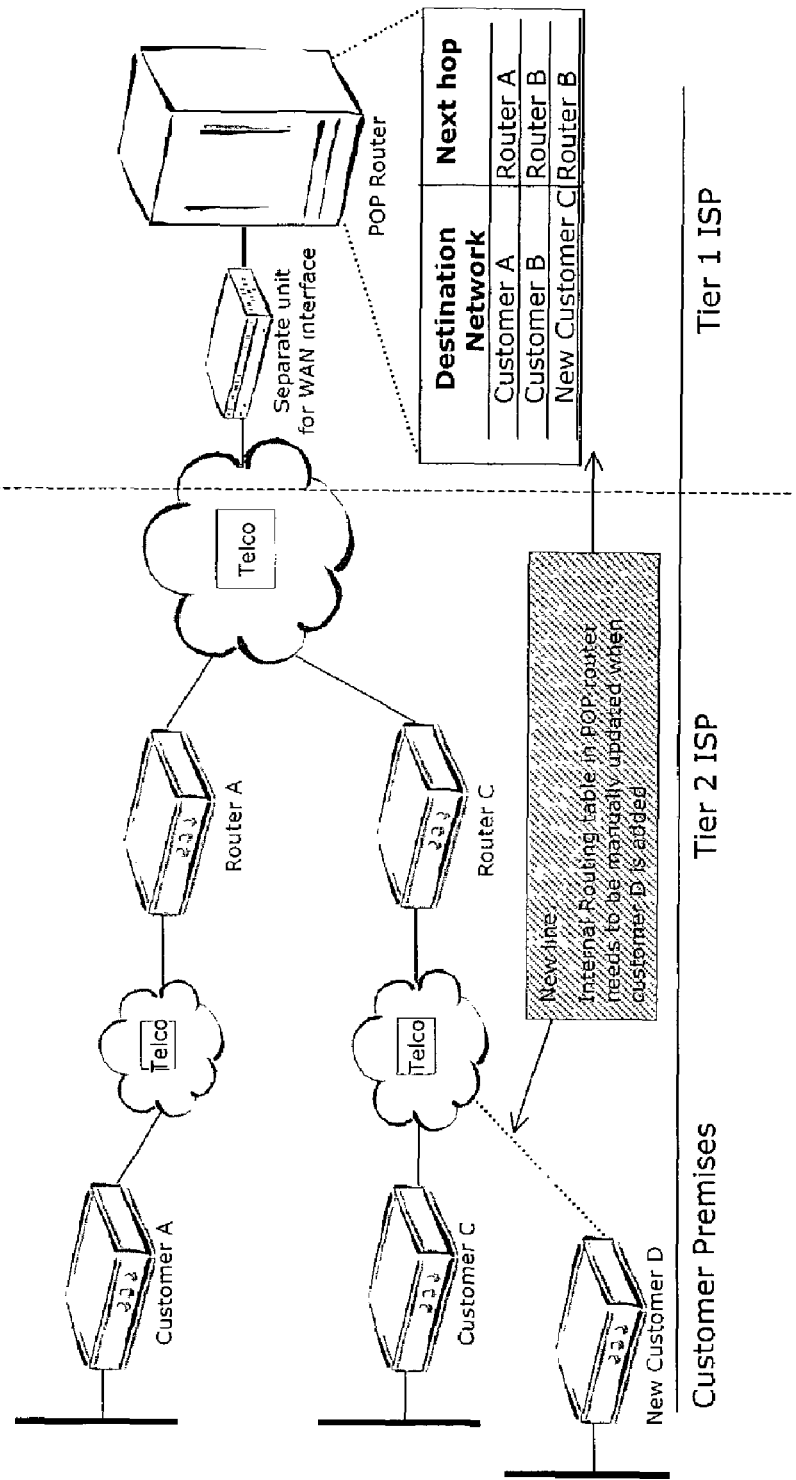
FIG. 3 shows a conventional "static forwarding" method, as applied to WAN functions.
Figure 4:
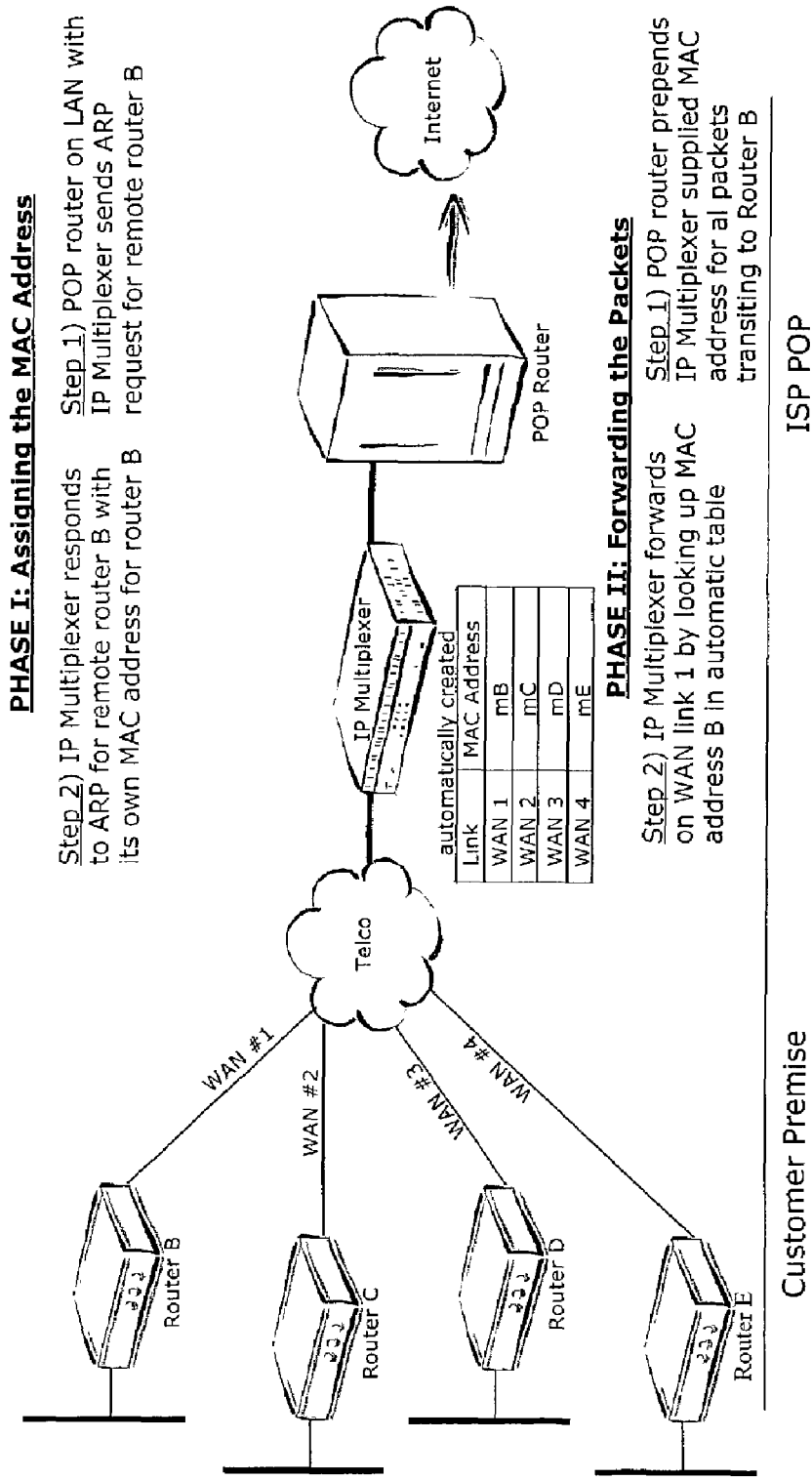
FIG. 4 shows the broad steps of IP Multiplexing.

The IP Multiplexer responds with the unique MAC address assigned to the WAN link on which the remote router is connected. This is labeled as "Assigning the MAC address" in FIG. 4. The Router on the LAN then prepends the Virtual MAC address to all IP packets that transit through the WAN Router B. The IP Multiplexer forwards the packet by just examining the Destination MAC address in the MAC header. This is referred to as "Phase II Forwarding the packets" in FIG. 4.

IP Multiplexers maintain transparency because, in one embodiment, IP Multiplexers do not participate in IP routing protocols; the Time to Live (TTL) Field in the IP header is not decremented so the IP header checksum is not recomputed; and IP Multiplexers do not generate ICMP unreachable, ICMP redirect and other ICMP control messages that an IP router would generate.

The Local Area Network interface on an IP Multiplexer can be, for example, the following LAN media: Ethernet; Fast Ethernet (100 Mbps); Gigabit Ethernet (1 Gbps); Fiber Distributed Data Interface (FDDI); and Token Ring. IP Multiplexing is applicable to all of the above LAN media because the Address Resolution Protocol is used on each of these LAN media to resolve a host's MAC address. For simplicity in this description, Ethernet is used synonymously with the LAN interface. IP Multiplexing may also be used with other LAN media, not listed, so long as they employ an ARP-type address resolution mechanism.

The WAN interface on an IP Multiplexer can be, for example, the following: Physical WAN interfaces such as DS1, DS3, OC-3; Virtual WAN interfaces such as Frame Relay Permanent Circuits, Virtual Circuits, Frame Relay Permanent Virtual Circuits, Switched Virtual Circuits, and Asynchronous Transfer Mode Virtual Circuits.

The IP Multiplexing process can be used for forwarding both IP version 4 traffic, as well as IP version 6 traffic, since the IP Multiplexing forwarding process is Layer 3 header independent.

As for IP Address Configuration, the service provider can configure the IP address of the IP Multiplexer on each WAN link. Alternatively, the IP Multiplexer can determine the remote router's address automatically through the Point to Point Protocol. The service provider can configure an IP address on the Ethernet interface as well.

IP Multiplexing is now described in greater detail. The first part of this detailed description describes the flow of information across an IP Multiplexer-based network (a so-called "out of the box" description). The second part of this detailed description describes the flow of information within an IP Multiplexer (a so-called "in the box" description).

Figure 6:
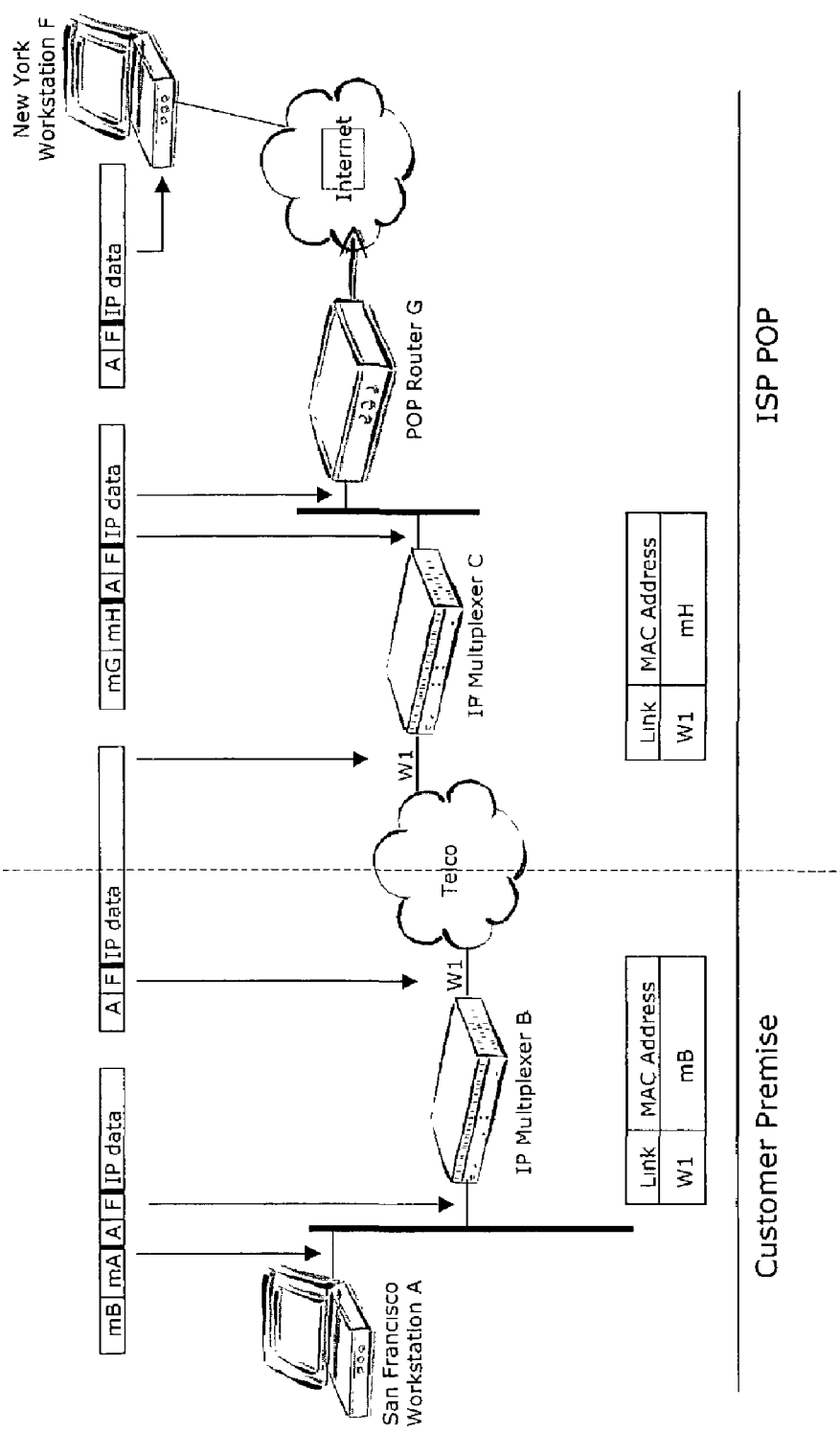
FIG. 6 shows the flow of one data packet in an IP Multiplexing example.

One way to understand IP Multiplexing is to take a step by step tour of its operation, which is now done with reference to FIG. 6. Let us consider the path of a packet from workstation A in San Francisco as it makes it way across the Internet to another workstation F in New York. There are two IP Multiplexers in the path of the packet, one at the customer premise (IP Multiplexer B) and another at the ISP POP (IP Multiplexer C).

We assume that the following have been completed before the packet flow. Routers have established paths to various destination networks using standard routing protocols—for example Border Gateway Protocol (BGP), Open Shortest Path First (OSPF). Both the IP Multiplexers B and C in FIG. 6 assign a unique virtual MAC address to each WAN interface. The assignment of MAC address to WAN link is preferably made automatically and does not need any user intervention. In this example, Workstation A on the LAN has the Router G configured as its default router.

Workstation A broadcasts an Address Resolution Protocol request packet to determine Router G's MAC address. IP Multiplexer B responds to the ARP request by providing a MAC address that it associates with the WAN link through which Router G is reachable. IP Multiplexer C responds with MAC address mB for WAN link 1 in the Address resolution reply packet. Thereafter, workstation A inserts MAC address mB in the MAC header of all IP packets transiting through router G and transmits it on the Ethernet segment. The IP Multiplexer listens to all packets on the Ethernet interface by putting itself in promiscuous mode. It receives the packet with mB as the destination MAC address. It sends the packet on WAN Link 1 by looking up the MAC address mB in its IP Multiplexing table as shown in FIG. 6. The IP packet travels across WAN link 1 and reaches IP Multiplexer C. IP Multiplexer C sends the packet over the Ethernet to its next hop, Router G. Router G consults its dynamic routing tables, determines the next hop router to reach workstation F and forwards the packet to the next hop. The previous step is repeated until the packet reaches the router to which F is directly connected, which delivers the packet to recipient workstation F.

The internal view of the IP Multiplexer is now discussed. Two main components of an IP Multiplexer, in one embodiment, are the Proxy ARP engine which responds to ARP requests on the LAN at address resolution time; and the IP Forwarding engine which forwards all IP datagrams received both on the LAN and the WAN.

The proxy ARP engine of this embodiment is now discussed. The IP Multiplexer module proxies ARP messages. More specifically, in one embodiment, the IP Multiplexer responds to ARP requests on its LAN interfaces for any IP host that it can reach through its WAN interfaces. As WAN interfaces are created, the IP Multiplexer assigns a virtual MAC address to each WAN link from a range of MAC addresses pre-assigned to the IP Multiplexer. When responding to ARP requests on behalf of the remote WAN routers, the IP Multiplexer uses a unique MAC address (from the pre-assigned range) assigned to the WAN interface through which the IP address in the ARP packet can be reached.

Figure 7:
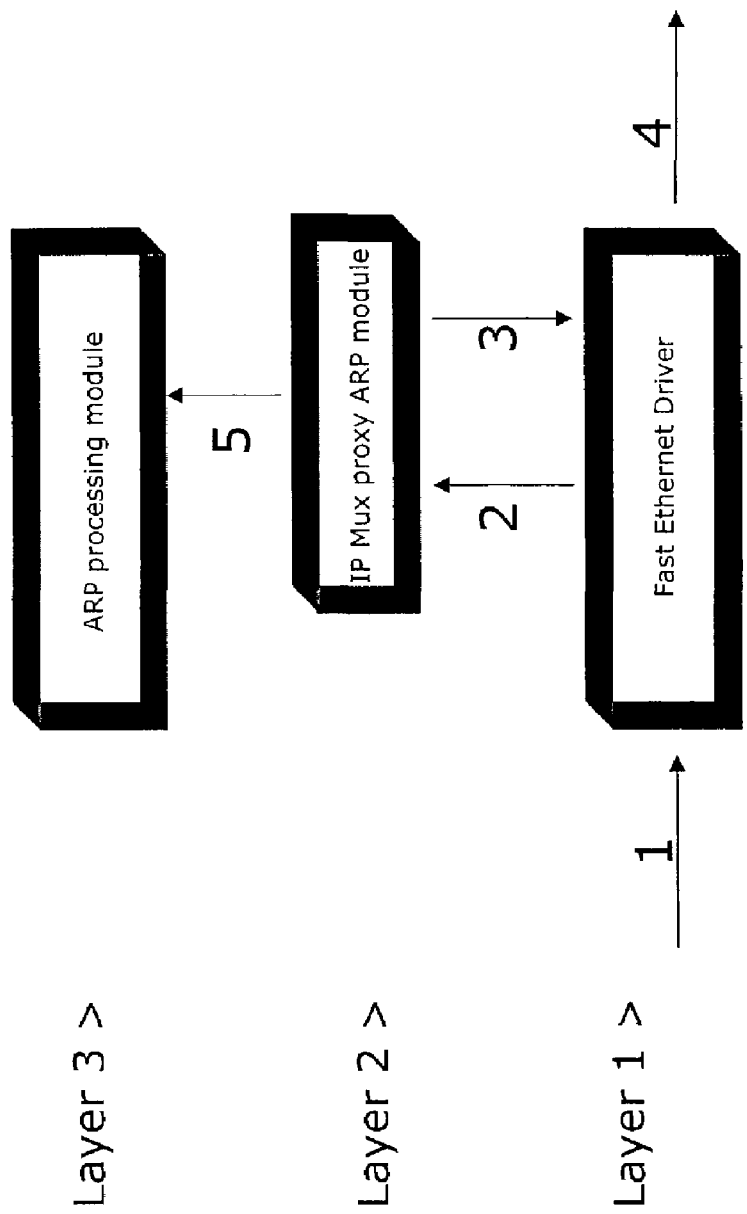
FIG. 7 shows illustrates proxy ARP processing by an IP Multiplexer.

Data Flow through the Proxy ARP Module of the IP Multiplexer is illustrated in FIG. 7 as follows:

1. An ARP packet enters the IP Multiplexer over the Ethernet interface.
2. The Ethernet Driver passes the ARP packet up to the IP Multiplexer Proxy ARP engine
3. If the target IP address in the ARP packet can be reached through one of the WAN interfaces, the IP Multiplexer Module builds an ARP response. The MAC address used in the ARP response is the one assigned to the WAN interface through which the target IP address is reachable.
4. The ARP response packet is sent on the same interface the request came in on.
5. If the target IP address in the ARP request is that of the IP Multiplexer itself or if the packet is an ARP response the packet is passed up by the IP Multiplexer Module to the ARP Module.
6. If the ARP request is for determining the MAC address of the IP Multiplexer itself, the basic ARP processing module responds with the MAC address assigned to the Ethernet interface.
7. If the packet is an ARP response, the basic ARP processing module caches the MAC address of the replying host in its ARP table.

The forwarding engine is now discussed with reference to FIG. 8, which shows the connectivity among various modules in an IP Multiplexer. The portions shaded in gray do not constitute part of the IP Multiplexer and perform the normal operations of a TCP/IP host. It is used to process IP packets sent to the IP Multiplexer's IP address.

In one embodiment, the IP Multiplexing forwarding engine employs a different approach for forwarding packets from the LAN to the WAN versus forwarding packets received on the WAN. They are described separately in following sections.

A WAN interface using PPP encapsulation is considered. However, with IP Multiplexing, any Layer 2 WAN protocol can be used—PPP, HDLC and Frame Relay routers, for example. In addition, the link is assumed to be in the open state after having negotiated the link parameters.

Data flow across the IP Multiplexer while forwarding a packet received on a LAN interface to the WAN is described in this section. The Ethernet interface operates in promiscuous mode so that the IP Multiplexer can receive packets that are addressed to a range of MAC addresses, and not just one MAC address.

The following steps are taken.
1. The Ethernet driver receives every packet transmitted on the Ethernet segment, since the Ethernet driver is operating in promiscuous mode.
2. The Ethernet driver passes the packet up to the IP Multiplexer.
3. The IP Multiplexer matches the first three bytes of the Destination Address in the MAC header with the range of MAC addresses pre-assigned to the IP Multiplexer. If a match is not found, the IP packet is discarded.
4. If the MAC address is within the range of MAC addresses assigned to the IP Multiplexer, the last three bytes of the MAC address are used to compute the WAN interface to forward the packet on 5. The IP Multiplexer uses the result of the lookup to determine which WAN interface to forward the IP packet on. If the packet is addressed to the IP Multiplexer, the packet is passed up to the TCP/IP stack.
6. If the packet needs to the forwarded on a WAN interface, it sends the packet to the downstream WAN Layer 2 module if it is in an active state.
7. The PPP Module [or any Layer 2 WAN protocol] prepends the appropriate Layer 2 encapsulation to the IP packet and sends it out the WAN interface.

Data Flow across the IP Multiplexer while forwarding a packet received on a WAN interface to the LAN is described in this section. While the description below illustrates the forwarding of a packet from the WAN to the LAN, the algorithm set forth here may also be used to forward packets from one WAN interface to another WAN interface.

Figure 8:
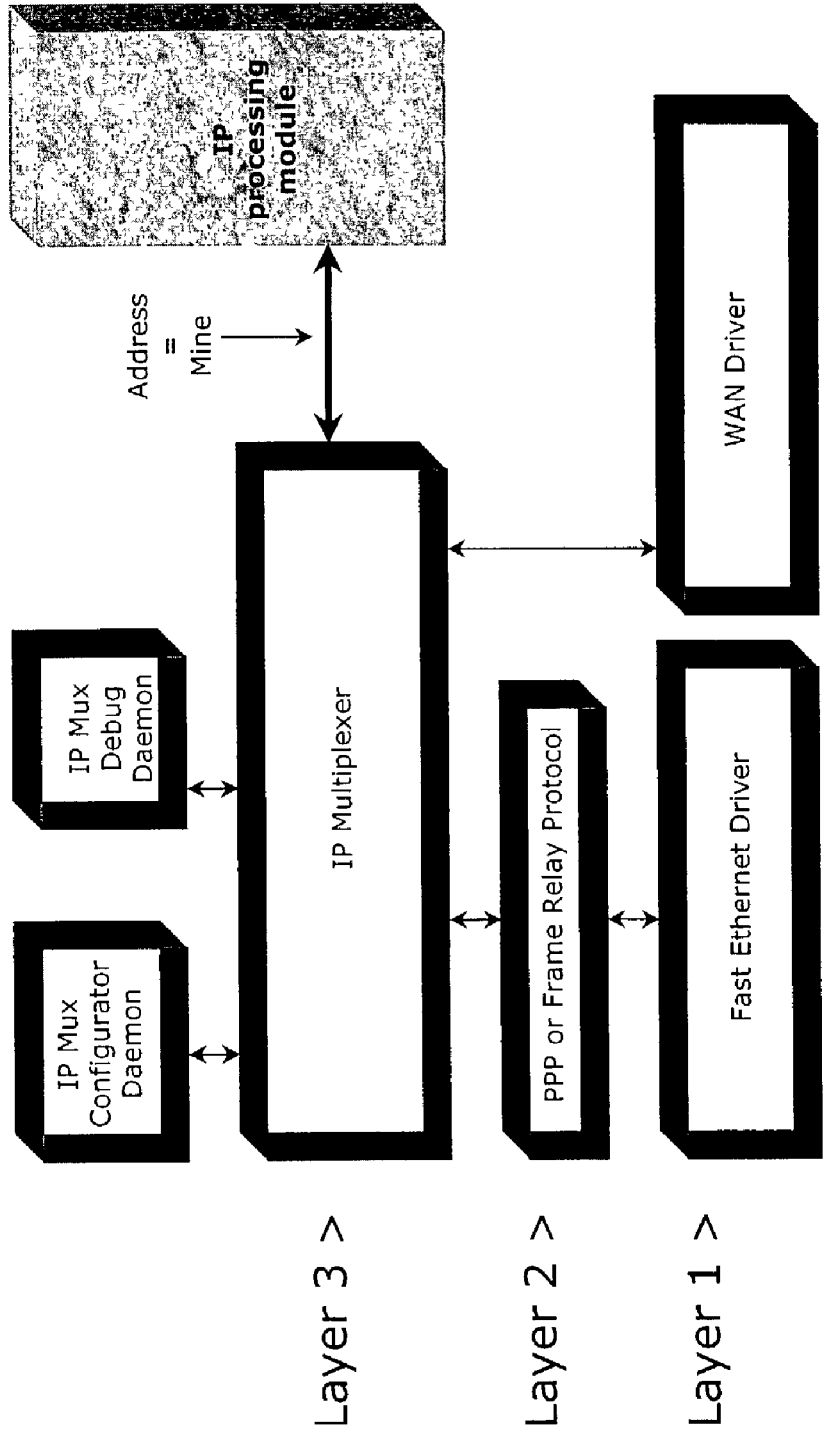
FIG. 8 illustrates packet forward processing by an IP Multiplexer, where the IP Processing Module represents conventional operations of a TCP/IP host.

Referring now to FIG. 8,
1. An unicast IP packet arrives on a WAN interface.
2. The WAN Driver passes the packet up to the PPP Multiplexer module
3. The PPP Multiplexer processes the received packet since the given link is in the open state. It verifies that this is a valid data packet and passes the packet up to the IP Multiplexer layer after removing the Layer 2 encapsulation. If the packet size exceeds the Link's Maximum Receive Unit size the packet is dropped.
4. The IP Multiplexer uses the following precedence rules in forwarding the packet from the WAN to the LAN:
If the packet is to a directly connected host, for example, on the Ethernet segment, it forwards the packet to the directly connected host after resolving the host's MAC address using ARP or by looking up its ARP cache
If source interface forwarding is configured, the packet is sent to a default gateway configured for that WAN link
If neither of the above conditions exist, the IP Multiplexer looks up the Destination IP address in its "Longest Match" IP Forwarding Table which is based on static routes configured by the user. If a match is found, the IP Multiplexer sends the IP packet to the appropriate output interface. This can be either the Ethernet interface or the WAN interface.
If forwarding out the Ethernet interface the IP Multiplexer must pass the source MAC address corresponding to the WAN interface it was received on. This is because the source MAC address must be that of the WAN interface the packet was received on.
5. If the packet size exceeds the Maximum Transmission Unit of the outgoing interface, the IP Multiplexer fragments the packet as per IP fragmentation procedures and transmits multiple packets out the outgoing interface.
6. If a matching forwarding entry is not found for a particular IP address, the packet is forwarded to the default router for the IP Multiplexer. If a default router is not configured and the lookup fails, the packet is dropped.

To summarize, IP Multiplexing is an innovative packet forwarding technique with the advantages of performance and transparency.

Regarding performance, it is very efficient to forward a packet with IP Multiplexing for the following reasons:
An IP Multiplexer looks up the Layer 3-destination address only at address resolution time. After that, IP datagrams are forwarded using the layer 2 LAN address as a forwarding tag.
The IP Multiplexer employs an exact match algorithm to determine the output interface whereas an IP router uses a longest match algorithm. The first three bytes of the MAC address of every packet the IP Multiplexer needs to forward are ensured to be within the pre-assigned range of MAC addresses for the IP Multiplexer. Therefore, e.g., only the last three bytes need to be indexed to find the matching route. This makes for very fast look up and forwarding. In comparison, the lookup performed by other forwarding techniques "the Longest Prefix match" is very compute intensive. According to this "Longest prefix" rule, in order to forward a given packet, the router must pick the most specific route in its table or the route with the greatest number of bits that match an IP address in its table.

The IP Multiplexer does not modify the IP header when forwarding the IP packet.

As for transparency, IP Multiplexing works transparently between existing IP routers, including transparency to adds, moves and changes; transparency to routing protocols; and transparency to multihoming, redundancy and load balancing.

Figure 9:
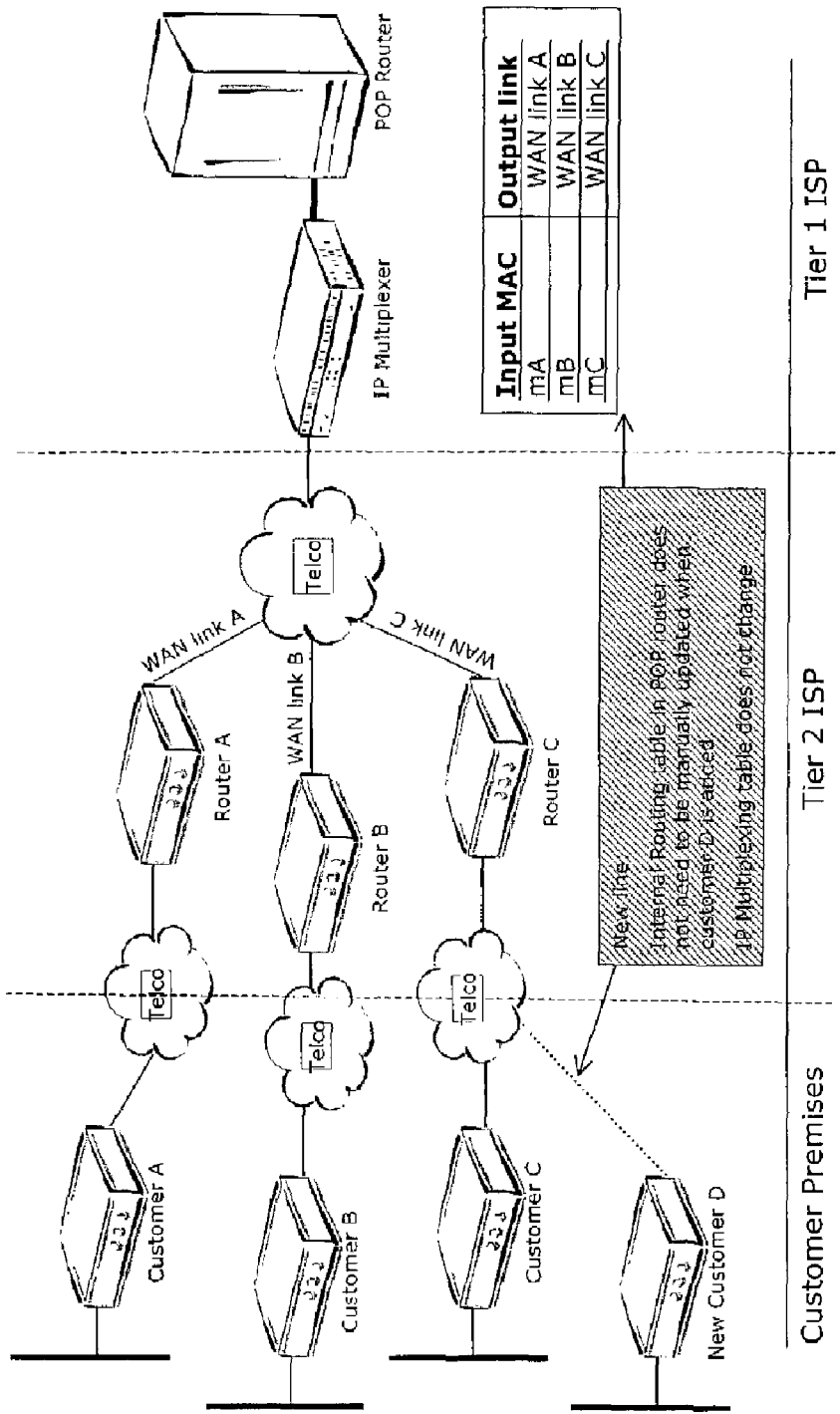
FIG. 9 illustrates an example of how adds, moves and changes to the WAN configuration of a network is transparent to IP Multiplexing.

The IP Multiplexer maintains information about the routers that are directly connected to it on the WAN side. Therefore, it is not affected by adds, moves and changes to routers that are multiple hops away from it, as shown in FIG. 9. As a result, IP Multiplexing does not suffer from the shortcomings of static forwarding where the forwarding table needs to be manually added whenever a customer's IP address changes or a new customer comes online.

IP Multiplexing is transparent to IP Routing Protocols, including BGP, OSPF and RIP. For example, the Border Gateway Protocol employs the same IP unicast traffic to setup its TCP control connection and exchange routing updates. Therefore, a BGP peering session between two routers with IP Multiplexers in between works transparently as it does for normal IP traffic.

Figure 11:
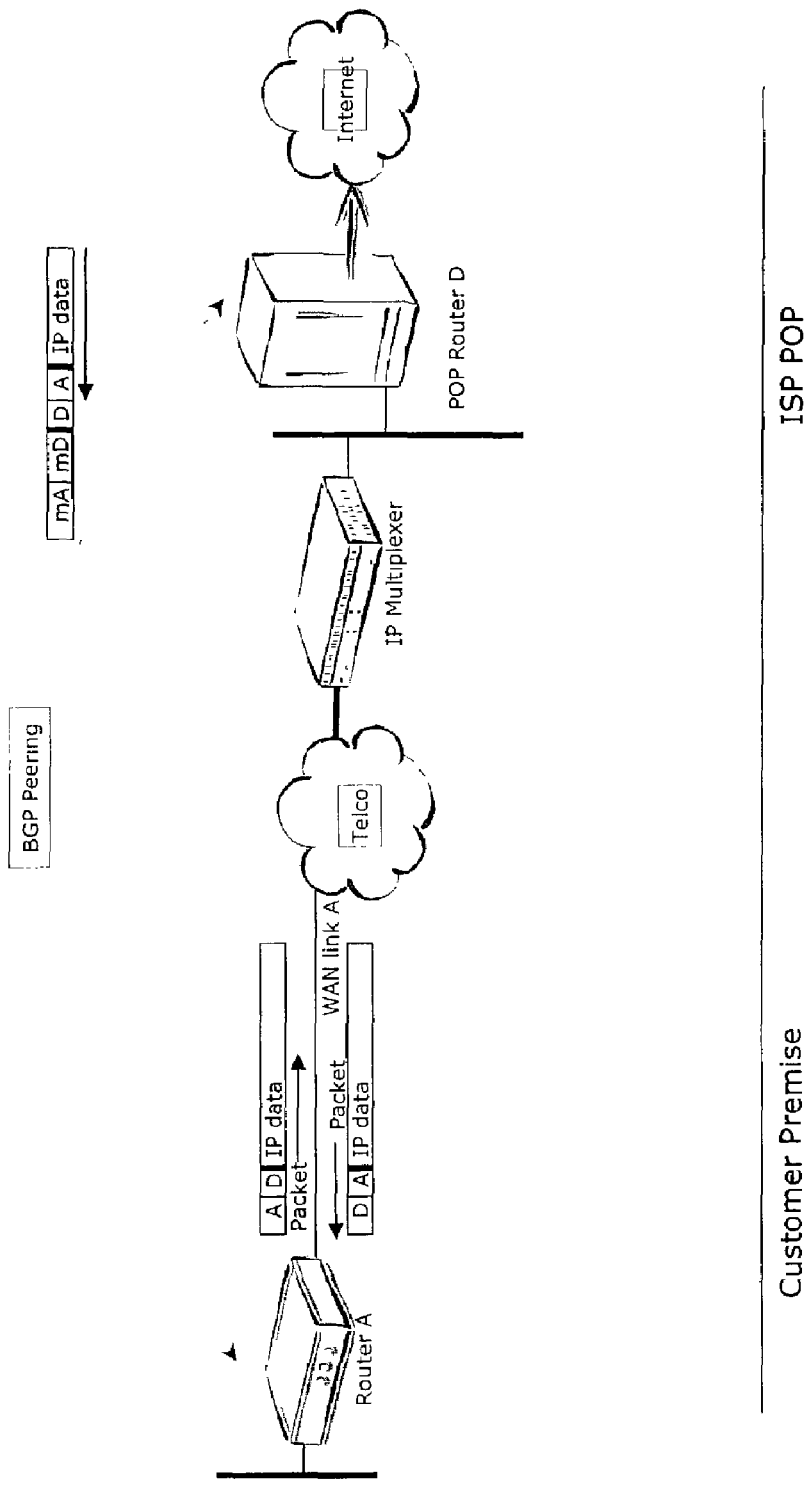
FIG. 11 illustrates BGP transparency with an IP Multiplexer.

Let us consider the example of a Router A at Customer Premise exchanging BGP information across an IP Multiplexer with Router D at a Service Provider Point of Presence, as shown in FIG. 11. The following steps are taken:
1. Firstly, Router A and D establish a TCP connection on which to exchange BGP updates.
2. Router A informs Router D of all the networks it provides reachability to, behind it and Router D does likewise
3. After connection setup, the routers exchange "keepalive" messages
4. If there should be a change in the state of any network, Router A & D inform each other to keep their routing tables in sync.

Figure 10:
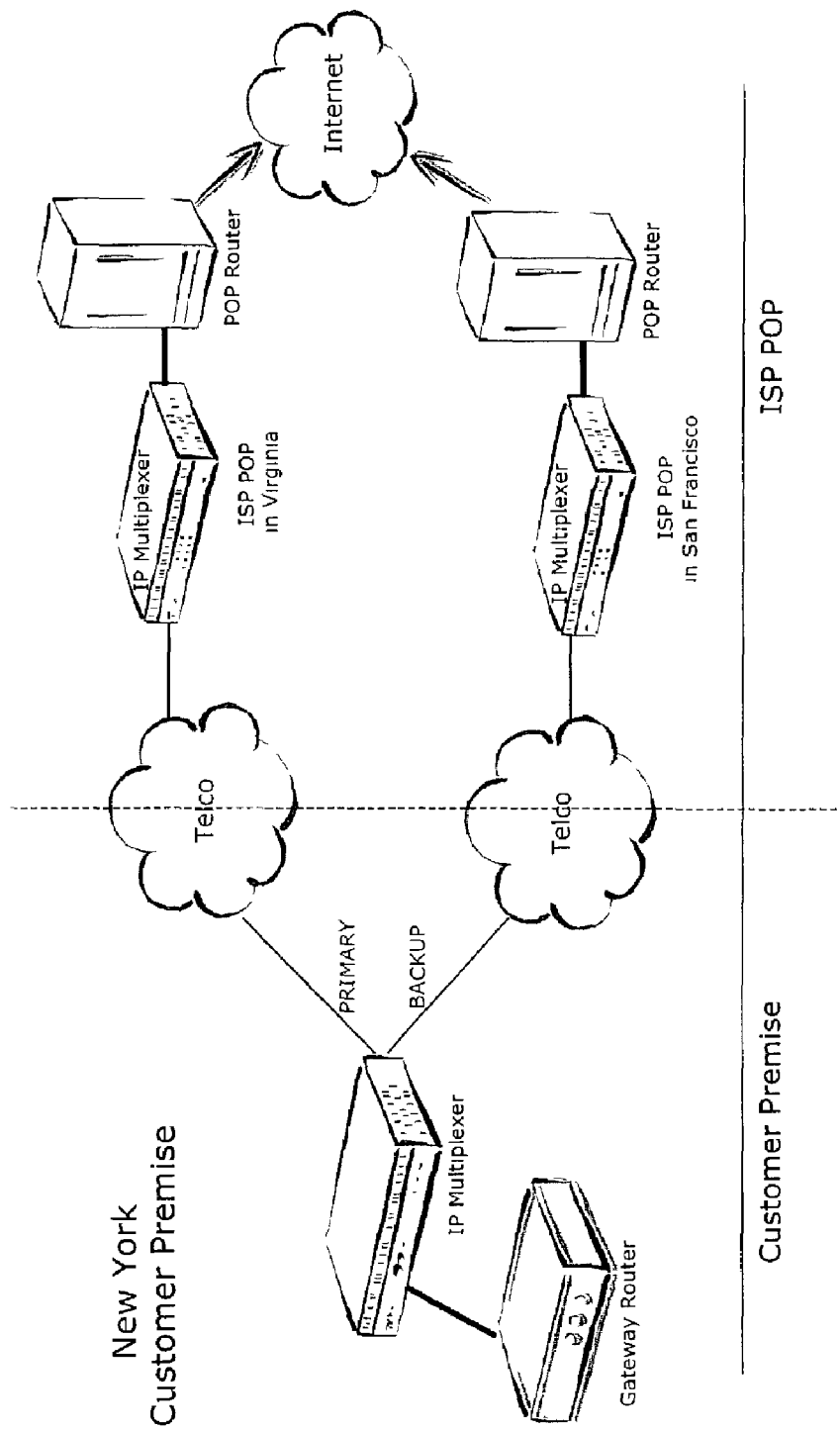
FIG. 10 illustrates an example of multihoming, load balancing and redundancy with IP Multiplexing.

We illustrate with an example how IP Multiplexing transparently supports Multihoming, redundancy and load balancing. Consider the case of a customer who has multiple T1 connections to the Internet one going to a service provider in San Francisco and another one in Virginia as shown in FIG. 10. Both the customer and the Service provider use the IP Multiplexer for WAN access and WAN Aggregation respectively. The CPE router transparently peers with POP routers in Virginia and San Francisco. It picks the T1 connecting to the Virginia as the primary path based on the metrics advertised for both the paths by the POP routers. Should the router in Virginia fail, the CPE router transparently switches over to the backup path through the SFO router. It detects the failure through the routing protocol. Since IP Multiplexers transparently pass the routing protocols, the failover also happens transparently. Similarly, IP Multiplexing transparently supports load balancing over multiple WAN links should the routers discover multiple paths with equal cost.

IP Multicast Transparency with IP Multiplexing is now discussed. IP Multicast is a mechanism whereby a single packet can be delivered to multiple recipients. It provides a standards-based way of grouping users for audio and video applications. It eliminates the need for a packet to be replicated when it needs to be delivered to multiple destination hosts.

The Internet Group Membership Protocol (IGMP) is an integral part of the IP Multicast standard. It is a protocol for discovering IP Multicast hosts. IP Multicast capable hosts send IGMP Join messages on joining a Multicast group. Multicast routers send IGMP Queries periodically on all the interfaces they are connected to find out if there are any Multicast capable hosts. End stations respond to the query by sending IGMP Reports indicating the Multicast groups of which they are members. Routers remove entries for membership on a given interface on seeing a IGMP Leave message.

Multicast routers discover Multicast sources and receivers across the Internet by exchanging Routing messages amongst themselves. These routers build a Multicast-spanning tree, which includes the Multicast source and has the receivers present at the leaves of the tree. Examples of IP Multicast Routing Protocols include Protocol Independent Multicast (PIM) and Distance Vector Multicast Routing Protocol (DVMRP).

IP Multicast Forwarding with IP Multiplexing is now discussed. IP Multicast Forwarding forwards IP Multicast datagrams without participating in both the IP Multicast Group Membership Protocols and the IP Multicast Routing Protocols. This method works transparently regardless of the IP Multicast routing protocol used. It also does not flood packets on all the interfaces, as a bridge would. It discovers where are the recipients for a IP Multicast group, as well as the routers. It does this by "listening" to and learning from IP Multicast control messages. The IP Multiplexer learns which interfaces Multicast routers and hosts are present on by listening to:

IGMP Join to discover Multicast hosts to the Multicast forwarding table

IGMP Leave to remove Multicast hosts from the forwarding entry for the group

IGMP Query Messages to discover Multicast routers

PIM Join, Graft and Prune Messages to discover IP Multicast routers

PIM Prune Messages to remove IP Multicast routers from the forwarding table entry An example as depicted in FIG. 12 is used to illustrate how an IP Multiplexer builds a forwarding entry for a Multicast group. Let us consider the example of an IP Multiplexer which has 8 WAN interfaces and 1 LAN interface numbered WAN1-WAN 8 and LAN1 respectively. The Multicast Group M used in this example is assumed to have the IP address 224.1.1.1. When the IP Multiplexer starts up it assumes it has no forwarding entries. It sees an IGMP Join on WAN1 for Multicast Group 224.1.1.1 on WAN1; it adds WAN1 to the forwarding entry for 224.1.1.1. Similarly, When it sees a IGMP Join for Multicast Group 224.1.1.1 on WAN2 it adds WAN2 to the forwarding table entry for Multicast Group 224.1.1.1. When it receives a Multicast data packet for Multicast Group 224.1.1.1 on the LAN interface LAN1, it forwards it out on WAN1 and WAN2. Similarly, when it sees a PIM Join Message or IGMP Query on the LAN it marks the LAN interface as a router interface. Any Multicast data packet for the Multicast Group 224.1.1.1 received on WAN interface WAN1 is forwarded out the LAN interface LAN1 since it is a router port. In addition, it forwards it out on WAN interface WAN2.

To summarize, the IP Multiplexer uses the following algorithm to forward Multicast datagrams. Interfaces that have routers present on them are marked as the "uplink interfaces", whereas interfaces that have IP Multicast hosts present on them are designated as "member" interfaces. IP Multicast packets received on the uplink are sent on all the member interfaces. IP Multicast data packets received on the member interfaces are forwarded on all the remaining member interfaces as well as on the uplink. IP Multiplexing provides a efficient yet simple means of transporting IP Multicast.

A number of acronyms have been used in this specification. For convenience, the acronym definitions are compiled below.

| | |
|---|---|
| ARP | Address Resolution Protocol |
| BGP | Border Gateway Protocol |
| CPE | Customer Premise Equipment |
| CPU | Central Processing Unit |
| CRC | cyclic redundancy check |
| DLCI/PVC | Data Link Control Identifier |
| DMA | Direct Memory Access |
| DR | Designated Router |
| DSU | Data Service Unit |
| EGP | Exterior Gateway Protocol |
| HDLC | High-level Data Link Control |
| ICMP | Internet Control Message Protocol |
| IEEE | Institute of Electrical and Electronic Engineers |
| IGRP | Interior Gateway Routing Protocol |
| IP | Internet Protocol |
| IPCP | Internet Protocol Control Protocol |
| ISP | Internet Service Provider |
| LAN | Local Area Network |
| LC Trie | Level Compression Trie |
| LCP | Link Control Protocol |
| MAC | Media Access Control |
| Mbps | Megabits per second |
| MIB | Management Information Base |
| MRU | Maximum Transmission Unit |
| OSPF | Open Shortest-Path First Interior Gateway Protocol |
| POP | Point of Presence |
| PPP | Point-to-Point Protocol |
| RARP | Reply Address Resolution Protocol |
| RFC | Request For Comments (standards) |
| RIP | Routing Information Protocol |
| SNMP | Simple Network Management Protocol |
| TCP | Transmission Control Protocol |
| UDP | User Datagram Protocol |
| WAN | Wide Area Network |

What is claimed is:

1. A data forwarder to forward data on a computer network, including:

a plurality of interfaces including member interfaces and at least one uplink interface, the at least one uplink interface for connection to a router, and the at least one uplink interface not any of the member interfaces;

means for grouping one or more of the member interfaces to form a first multicast group;

means for receiving first data over one of the at least one uplink interface, the received first data including a first information content and an address of the first multicast group;

means for receiving second data including a second information content and the address of the first multicast group over a first interface, in which the first interface is one of the member interfaces, means for storing a forwarding table containing plural forwarding entries for corresponding plural multicast groups, a particular one of the forwarding entries mapping the first multicast group to one or more identifiers of the one or more member interfaces that are part of the first multicast group, wherein the table does not store corresponding one or more identifiers of the at least one uplink interface;

means for forwarding, based on the particular forwarding entry, the first information content to the one or more member interfaces of the first multicast group;

means for forwarding the second information content to the at least one uplink interface and for forwarding, based on the particular forwarding entry, the second information content to the one or more member interfaces other than the first interface of the first multicast group.

2. The forwarder of claim 1, wherein the grouping means includes:

means for receiving a join message from a second of the interfaces, the join message including the address of the first multicast group; and means responsive to the join message receiving means, for grouping the second interface with the one or more interfaces of the first multicast group.

3. The forwarder of claim 2, wherein the means for grouping one or more of the member interfaces to form a first multicast group further includes:

means for receiving a leave message from the first interface that is part of the first multicast group including the address of the first multicast group; and means responsive to the leave message receiving means, for ungrouping the first interface from one or more other interfaces of the first multicast group.

4. The forwarder of claim 1, and further comprising:
means for receiving an uplink join message; and
means responsive to the uplink join message receiving means for designating an interface on which the uplink join message is received as an uplink interface.

5. The forwarder of claim 1, and further comprising:
means for receiving an uplink query message; and
means responsive to the uplink query message receiving means for designating an interface on which the uplink query message is received as an uplink interface.

6. The data forwarder of claim 1, wherein the one or more identifiers of the one or more member interfaces in the forwarding entry are different from router addresses and host addresses.

7. The data forwarder of claim 1, wherein the one or more identifiers of the one or more member interfaces in the forwarding entry are layer 2 identifiers.

8. The data forwarder of claim 1, wherein the second information content is forwarded to the at least one uplink interface without accessing any forwarding table.

9. A computer-implemented method for forwarding data on a computer network, comprising:

determining whether interfaces on a data forwarder represent member interfaces that are part of a first multicast group;

identifying one or more uplink interfaces on the data forwarder, in which the one or more uplink interfaces are not member interfaces;

storing a forwarding table having plural forwarding entries for corresponding plural multicast groups, a particular one of the forwarding entries maps the first multicast group to identifiers of the member interfaces, and the table does not map the first multicast group to the one or more uplink interfaces;

receiving multicast information content on a first interface on the data forwarder, in which the first interface is one of the member interfaces; and forwarding the multicast information content to the one or more uplink interfaces, and forwarding, based on the particular forwarding entry, the multicast information content to one or more interfaces of the first multicast group other than the first interface.

10. The method of claim 9, further comprising determining whether one of the one or more uplink interface represents a multicast uplink interface.

11. The method of claim 9, in which the member interfaces are WAN interfaces.

12. The method of claim 11, in which the first multicast group bonds channels into a single higher speed connection.

13. The method of claim 9, in which whether an interface represents a member interface is determined by listening to a multicast control message for the first multicast group.

14. The method of claim 13, in which the multicast control message is a join message.

15. The method of claim 13, in which the multicast control message is a leave message.

16. The method of claim 9, in which the data forwarder determines one of the one or more uplink interfaces to be part of the first multicast group.

17. The method of claim 9, in which one of the one or more uplink interfaces has a routing device present on the uplink interface.

18. The method of claim 9, in which one of the one or more uplink interfaces is a LAN interface.

19. The method of claim 9, wherein the identifiers of the member interfaces are different from router addresses and host addresses.

20. The method of claim 9, wherein the identifiers of the member interfaces are layer 2 identifiers.

21. The method of claim 9, wherein the multicast information content is forwarded to the one or more uplink interfaces without accessing any forwarding table.

22. A data forwarder for forwarding information on a computer network, comprising:

means for determining whether interfaces on the data forwarder represent member interfaces that are part of a first multicast group;

means for identifying one or more uplink interfaces on the data forwarder, in which the one or more uplink interfaces are not member interfaces, and wherein the one or more uplink interfaces are for connection with one or more corresponding routers;

means for storing a forwarding table having plural forwarding entries for corresponding plural multicast groups, wherein a particular one of the forwarding entries maps the first multicast group to identifiers of the member interfaces, and the table does not map the first multicast group to the one or more uplink interfaces;

means for receiving information content on a first interface on the data forwarder, in which the first interface is one of the member interfaces;

means for forwarding the information content to the one or more uplink interfaces, and forwarding, based on the particular forwarding entry, the information content to one or more interfaces of the first multicast group other than the first interface.

23. The data forwarder of claim 22, wherein the information content is forwarded to the one or more uplink interfaces without accessing any forwarding table.

* * * * *